Patented Oct. 8, 1935

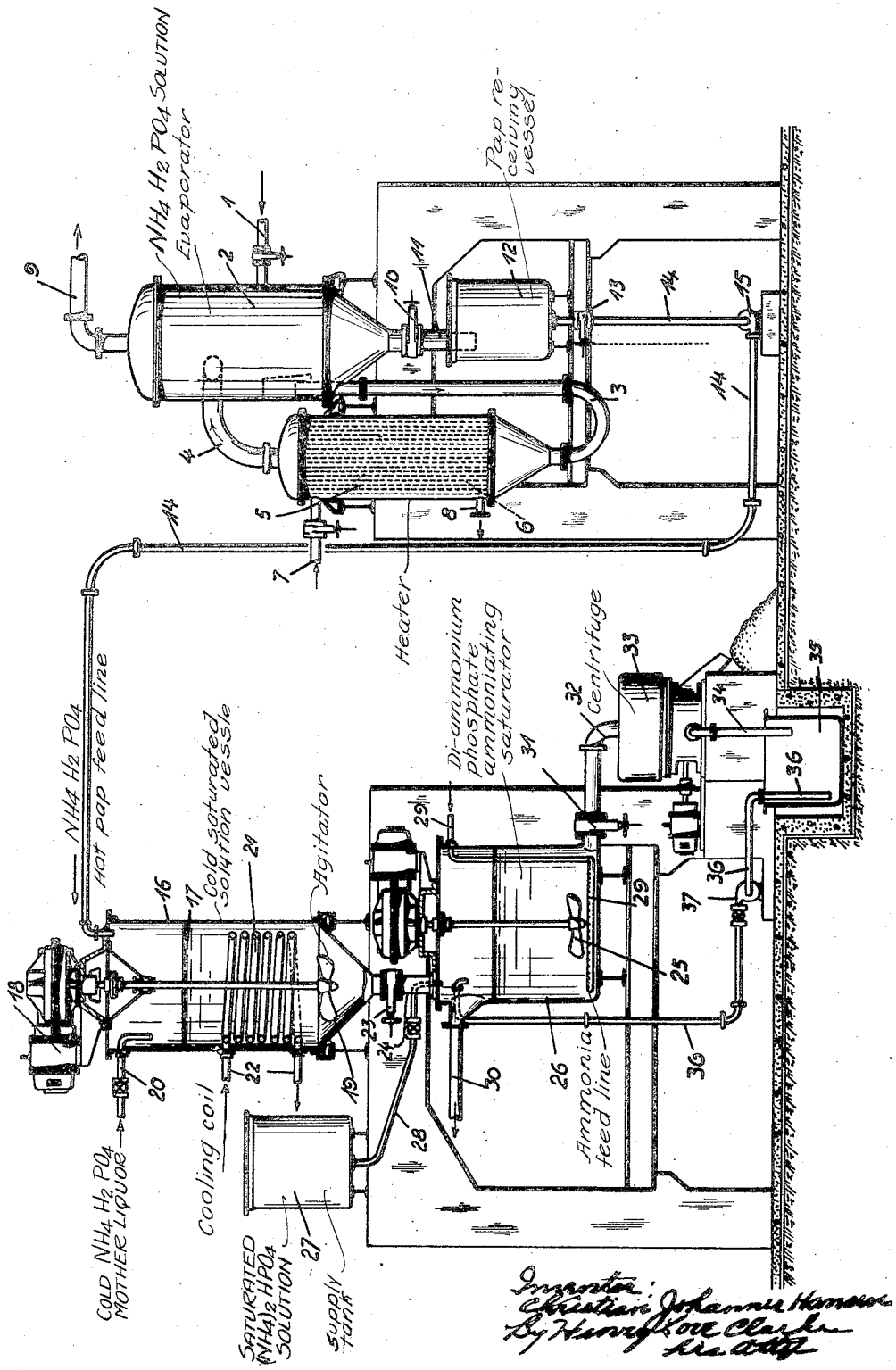

2,016,816

UNITED STATES PATENT OFFICE 2,016,816

MANUFACTURE OF DI-AMMONIUM PHOSPHATE FROM SOLUTIONS CONTAINING AMMONIUM PHOSPHATE

Christian Johannes Hansen, Essen-Ruhr, Germany, assignor, by mesne assignments, to The Koppers Company of Delaware, Pittsburgh, Pa., a corporation of Delaware Application December 2, 1931, Serial No. 578,461
In Germany December 3, 1930

4 Claims. (Cl. 23—107)

This invention relates to the manufacture of solid ammonium phosphate from solutions containing ammonium phosphate and more particularly to the production of solid di-ammonium phosphate from solutions containing this compound.

In my co-pending patent application Serial No. 533,807 filed May 7th 1931 I have described a process for obtaining solid di-ammonium phosphate from ammonium phosphate solutions which consists in evaporating the ammonium phosphate containing salt solution in a vaporizer, removing from the vaporizer the salt mixture formed thereby and treating with an ammoniacal saturated di-ammonium phosphate solution for the purpose of converting the mono-ammonium phosphate into di-ammonium phosphate. In technically carying out this process certain difficulties have arisen in so far as in practice it is not always possible to separate the mother lye with simple means from the salt pap removed from the vaporizer. In practice the mother lye cannot be prevented from cooling down somewhat after being removed from the vaporizer. In this way such considerable quantities of solid salt separate from the mother lye that in certain cases the whole mass stiffens to a solid lump, thereby clogging the centrifugals and the pipe systems.

One object of my invention is to provide improvements in the production of solid mono-ammonium phosphate or salt mixtures containing mono-ammonium phosphate which avoids the danger of clogging by solidification of the salt pap from which the solid mono-ammonium phosphate is obtained.

My new process consists in mixing the hot salt pap leaving the vaporizer first of all with a cold saturated or almost saturated mono-ammonium phosphate solution and only then separating the mother lye from the crystals contained in the salt pap.

A further object of my present invention is to provide improvements in the production of solid di-ammonium phosphate from solutions which contain mono-ammonium phosphate which will likewise overcome the above described difficulty.

This latter improved process consists essentially in evaporating in a vaporizer the mono-ammonium phosphate containing solution which is to be worked to a solid salt, and then passing the salt pap withdrawn from the vaporizer without substantial cooling into an agitator which contains cold saturated or almost saturated di-ammonium phosphate mother lye. In this case also the salt pap withdrawn from the vaporizer is cooled down without forming solid lumps whereupon the separated salt which consists mainly of mono-ammonium phosphate is converted into di-ammonium phosphate by being further stirred with the mother lye to which ammonia preferably in the gaseous form is added, the di-ammonium phosphate being then separated from the mother lye by centrifugals or the like.

The great advantage of the process consists in the fact that as the salt pap removed from the vaporizer is stirred into the cold saturated mother lye it is cooled down. At the same time the concentrated mother lye adhering thereto is so strongly diluted that the salt pap no longer solidifies on cooling down. It is thereby possible without difficulty to treat the salt pap removed from the vaporizer and mixed with saturated mother lye in a centrifugal or the like for the purpose of separating the mother lye from the crystals. The new process described herein can also be carried out by converting the salt mixture consisting mainly of mono-ammonium phosphate which is first formed in the evaporation stages into di-ammonium phosphate by stirring with saturated di-ammonium phosphate solution with addition of ammonia, simultaneously with the cooling down by admixing the cold solution, which leads to a great simplification of the process.

With particular advantage according to the invention the salt pap diluted with the cold saturated mother lye can be freed of a part of the mother lye before the treatment with the ammoniacal di-ammonium phosphate solution, for instance by stopping the agitator for a short time and allowing the salt to settle. My invention also permits the above described operations that is, the dilution of the hot salt pap with cold almost saturated mother lye and the subsequent treatment with ammoniacal saturated di-ammonium phosphate solution to be combined into a single operation whereby a further simplification of the process herein described is obtained. For this purpose the hot salt pap leaving the vaporizer is stirred directly into a saturated or almost saturated di-ammonium phosphate solution and the mixture then treated with ammonia.

The improved process herein described may be used for working practically all solutions which contain ammonium phosphate, particularly solutions which contain ammonium sulphate and ammonium phosphate as produced for instance in processes for removing ammonia and hydrogen sulphide from gases according to my co-pending patent application, Serial No. 426,771 filed February 7, 1930.

A further object of the invention is to provide an apparatus for carrying out the process according to the invention.

With these and other objects of the invention in view I will now describe the nature of the present invention on the lines of the accompanying drawing which shows a side elevation and partial longitudinal section through an apparatus suitable for carrying out the process according to the invention.

In the apparatus shown in the drawing the salt solution to be treated is passed through a pipe 1 to the evaporating vessel 2 of a vaporizer which is connected by a forward pipe 3 and a return pipe 4 with the heater 5 which in the ordinary manner has a series of heating tubes 6 through which the liquid to be vaporized is passed in a direction from bottom to top. The heater tubes 6 are swept over externally by steam which is supplied through the pipe 7 and withdrawn through the pipe 8.

The salt solution heated in the heater 5 is returned through the pipe 4 into the evaporating vessels 2 in which a low pressure is maintained by means of an air pump not shown in the drawing. The vapours forming from the solution leave the vessel 2 through the pipe 9.

The salt solution is confined in the vaporizer until solid crystals separate out from it. If an ammonium sulphate-ammonium phosphate solution is being worked from which it is desired to regain the two ammonium salts in the same proportion in which they were present in the primary solution, it is preferable to employ the process described in my patent application Serial No. 533,807.

The salt pap forming in the vaporizer is progressively or intermittently withdrawn through a pipe 11 controlled by a valve 10 into a vessel 12 in which the solid crystals are separated from the main part of the mother lye withdrawn therewith which is returned back into the vaporizer. The still fluid salt pap remaining in the vessel 12 is then passed into a vessel 16 by means of a pump 15 through the pipe 14 which is provided with a heat insulating jacket and is controlled by the valve 13. In this vessel there is a certain quantity 17 of a cold almost saturated mother lye. The salt pap is introduced into the mother lye contained in the vessel 16 whereby it is cooled. During this introduction the mixture is stirred by means of an agitator 19 driven by a motor 18.

Cold saturated mother lye flows into the vessel 16 through the pipe 20. For cooling the liquid in the vessel 16 the latter is also provided with pipe coils 21 through whose outer connection pipes 22, steam or cooling water may be passed as desired.

If di-ammonium phosphate is to be obtained as a final product the cooled salt pap passes from the vessel 16 through the pipe 24 controlled by the valve 23 into a vessel 26 likewise provided with an agitator 25. In this vessel there is a saturated ammoniacal di-ammonium phosphate solution which is passed to the vessel 26 from the supply tank 27 through a pipe 28.

The vessel 26 serves to convert the mono-ammonium phosphate contained in the cooled salt pap wholly or partially into di-ammonium phosphate when it is desired to produce solid mono-ammonium phosphate or a mixture of mono-ammonium phosphate and di-ammonium phosphate. For this purpose ammonia gas is passed from below through the liquid in the vessel 26, through the perforated pipe 29. In the vessel 26 the mono-ammonium crystals dissolve in a saturated di-ammonium phosphate solution, whilst at the same time the di-ammonium phosphate crystals formed separate out.

The vapours formed by the passage of ammonia through the liquid in the vessel 26 can escape through the discharge pipe 30. The ammonia contained in the vapours is preferably precipitated and returned again into the liquid in the vessel 26 or used again at another suitable stage in the process.

As soon as the conversion of the mono-ammonium phosphate into di-ammonium phosphate in the vessel 26 has reached the desired amount the liquid contained in the vessel 26 is passed through the pipe 32 controlled by a valve 31 into a centrifugal 33 in which the salts are separated from the mother lye.

The manner in which the process according to the invention is carried out may be illustrated by two following examples:

*Example 1*

11.1 parts of an 80° C. mixture consisting of 2.1 parts water, 5.4 parts ammonium sulphate and 3.6 parts mono-ammonium phosphate were stirred into 15.7 cbm. of a 20° warm ammonium sulphate mono-ammonium phosphate mother lye almost saturated at 20° C. and consisting of 11.0 parts water, 5.4 parts ammonium sulphate and 3.6 parts mono-ammonium phosphate. Thereby the temperature of the solution with the unsaturated salt contained therein rose to 40° C. After cooling down to 20° C. 6.6 parts salt of the following composition separated out: 30.4% sulphuric acid, 49.6% phosphoric acid, 18.05% ammonia, 2.2% water, i. e. about 41% ammonium sulphate and 57.5% mono-ammonium phosphate. 18.2 cbm. were yielded as a mother lye containing 6.1 parts ammonium-sulphate and 1.5 parts mono-ammonium phosphate.

The salt formed may be used in this form as a fertilizer but can also be converted into a mixture of ammonium sulphate and di-ammonium phosphate according to my process.

For this purpose 5.0 parts of the above obtained salt were introduced into 5.0 cbm. of a 20° C. warm solution of 17% di-ammonium phosphate, 27% ammonium sulphate and 56% water, after which concentrated gaseous ammonia was introduced during continued stirring until the solution smelled of ammonia. The temperature rose thereby to 55° C. After the conversion had taken place the solution was filtered. There were produced 5.4 cbm. of an ammonium sulphate di-ammonium phosphate mother lye saturated at 20% with about 1.2 parts di-ammonium phosphate and 3.0 parts ammonium sulphate and 4.3 parts salt consisting of 19.2% sulphate, 75.0% di-ammonium phosphate and 5.8% water.

*Example 2*

In 6.0 cbm. of a di-ammonium phosphate ammonium sulphate solution of 20° C. and having a composition 17% di-ammonium phosphate, 27% sulphate and 56% water, 8.0 parts of an 80° C. mixture consisting of 3.6 parts sulphate, 2.4 parts mono-ammonium phosphate and 2.0 parts water were introduced, and then ammonia in the form of concentrated gas added during further continued stirring. The temperature rose thereby to 48° C. When the ammonia was no longer completely absorbed and the solution smelled of ammonia it was cooled down to 20° and the separated salt fitered off. There were produced 6.0 cbm. mother lye with 2.19 parts sulphate and 0.70 part di-ammonium phosphate together with 4.7 parts solid salt with 52.7% di-ammonium phosphate, 45.9% ammonium sulphate and 1.4% water.

The invention as herein above set forth is embodied in a particular form but may be variously embodied within the scope of the claims hereinafter made.

I claim:

1. A method of producing solid mono-ammonium phosphate from solutions containing mono-ammonium phosphate comprising evaporating the solution containing mono-ammonium phosphate up to the crystallization point of the salt by heating the solution, separating salt pap formed from the evaporating operation while hot, mixing the withdrawn salt pap while still hot from the evaporating operation with a cold saturated solution of mono-ammonium phosphate to cool the pap without solidification into a solid mass and separating the solid salt from the cooling mixture.

2. A process for producing solid di-ammonium phosphate from mono-ammonium phosphate containing solutions comprising evaporating the solution containing mono-ammonium phosphate up to crystallization of the salt by heating the solution, separating the crystals from the largest part of the mother lye while hot therefrom, mixing the hot salt pap produced thereby and while still hot from the evaporating operation with a cold saturated solution of mono-ammonium phosphate and thereby cooling the pap without solidification into a solid mass, treating the mixture with a saturated di-ammonium phosphate solution in the presence of ammonia, and separating the solid salt from the mixture.

3. A process for producing solid mono-ammonium phosphate from mono-ammonium phosphate containing solutions comprising evaporating the solution containing mono-ammonium phosphate up to crystallization of the salt by heating the solution, separating the crystals from the largest part of the mother lye while still hot, mixing the hot salt pap produced thereby and while still hot from the evaporating operation with a cold saturated solution of mono-ammonium phosphate and thereby cooling the pap without solidification into a solid mass, cooling the mixture and separating the solid salt from the cooling mixture.

4. A process for producing solid di-ammonium phosphate from solutions containing mainly mono-ammonium phosphate, comprising evaporating by heating a solution of mono-ammonium phosphate up to crystallization of the salt, separating salt pap formed from the evaporating solution while hot, mixing the hot salt pap produced thereby and while still hot from the evaporating operation with a cold saturated solution of mono-ammonium phosphate and thereby cooling the pap without solidification thereof into a solid mass, cooling the mixture, and treating the mixture with a saturated di-ammonium phosphate solution in the presence of ammonia and separating the solid salt from the solution.

CHRISTIAN JOHANNES HANSEN.